(12) United States Patent
Peterson

(10) Patent No.: US 9,394,942 B2
(45) Date of Patent: Jul. 19, 2016

(54) BEARING ASSEMBLIES AND APPARATUSES INCLUDING SUPERHARD BEARING ELEMENTS

(71) Applicant: US Synthetic Corporation, Orem, UT (US)

(72) Inventor: S. Barrett Peterson, Orem, UT (US)

(73) Assignee: US Synthetic Corporation, Orem, UT (US)

( * ) Notice: Subject to any disclaimer, the term of this patent is extended or adjusted under 35 U.S.C. 154(b) by 64 days.

(21) Appl. No.: 14/181,601

(22) Filed: Feb. 14, 2014

(65) Prior Publication Data
US 2015/0233423 A1 Aug. 20, 2015

(51) Int. Cl.
*F16C 33/04* (2006.01)
*F16C 17/02* (2006.01)
*F16C 17/04* (2006.01)
*F16C 43/02* (2006.01)

(52) U.S. Cl.
CPC .............. *F16C 33/043* (2013.01); *F16C 17/02* (2013.01); *F16C 17/04* (2013.01); *F16C 43/02* (2013.01); *Y10T 29/49636* (2015.01); *Y10T 29/49638* (2015.01)

(58) Field of Classification Search
CPC ............ F16C 2352/00; F16C 2237/00; F16C 2206/04; F16C 33/043
See application file for complete search history.

(56) References Cited

U.S. PATENT DOCUMENTS

| | | | |
|---|---|---|---|
| 1,173,369 A | 2/1916 | Moore | |
| 4,560,014 A | 12/1985 | Geczy | |
| 4,738,322 A | 4/1988 | Hall et al. | |
| 4,802,539 A * | 2/1989 | Hall | E21B 10/20 175/371 |
| 5,480,233 A * | 1/1996 | Cunningham | 384/308 |
| 6,190,050 B1 * | 2/2001 | Campbell | 384/129 |
| 7,190,087 B2 | 3/2007 | Williams | |
| 7,870,913 B1 | 1/2011 | Sexton et al. | |
| 7,901,137 B1 | 3/2011 | Peterson | |
| 8,147,142 B1 | 4/2012 | Peterson | |
| 8,496,075 B2 | 7/2013 | Scott et al. | |
| 8,613,554 B2 | 12/2013 | Tessier et al. | |
| 8,708,564 B2 | 4/2014 | Cooley et al. | |
| 2004/0190804 A1 * | 9/2004 | John et al. | 384/420 |
| 2007/0046119 A1 * | 3/2007 | Cooley | F16C 17/02 310/90.5 |
| 2009/0097788 A1 * | 4/2009 | Cooley | E21B 4/003 384/107 |
| 2010/0237621 A1 * | 9/2010 | Tessier et al. | 290/52 |
| 2011/0024201 A1 * | 2/2011 | Scott et al. | 175/428 |
| 2011/0174544 A1 * | 7/2011 | Scott | E21B 4/003 175/92 |

OTHER PUBLICATIONS

International Search Report and Written Opinion received in PCT Application No. PCT/US2015/015896 on Jun. 3, 2015.

\* cited by examiner

*Primary Examiner* — Thomas R. Hannon
(74) *Attorney, Agent, or Firm* — ALG Intellectual Property, LLC

(57) ABSTRACT

A bearing assembly includes a support ring, a plurality of bearing-element carrier members coupled to the support ring, and a plurality of superhard bearing elements having a lateral periphery extending between a base and a superhard bearing surface. At least one superhard bearing element of the plurality of superhard bearing elements is attached to each of the plurality of bearing-element carrier members. A bearing apparatus includes a rotor, a stator, and a bearing assembly. A method for assembling a bearing assembly includes attaching at least one superhard bearing element to each of a plurality of bearing-element carrier members and coupling the plurality of bearing-element carrier members to a support ring.

17 Claims, 12 Drawing Sheets

BEARING ASSEMBLIES AND APPARATUSES INCLUDING SUPERHARD BEARING ELEMENTS

BACKGROUND

Thrust and radial bearing apparatuses are commonly used in a variety of mechanical applications. For example, subterranean drilling systems, turbomachinery, hydroelectric plants, wind mills, cranes, turbine generators, and power plant machinery may utilize bearing assemblies.

Wear-resistant, superhard materials are commonly utilized in various types of bearing assemblies. Conventional superhard materials have found utility as bearing elements, including bearing elements utilized in thrust bearing and radial bearing assemblies. A conventional polycrystalline diamond compact ("PDC") thrust-bearing assembly may include a steel rotor or stator bearing rings configured to accept a number of superhard bearing elements. The superhard bearing elements may be made from a polycrystalline diamond ("PCD") layer formed on a cemented tungsten carbide substrate.

One or more superhard bearing elements may be attached to a bearing rotor or stator by press-fitting, brazing, or through other suitable methods of attachment. Typically, bearing elements attached to a bearing rotor have superhard faces configured and oriented to contact corresponding superhard faces of bearing elements attached to an adjacent bearing stator.

Brazing the superhard bearing elements into the support ring may involve high temperatures that can damage (e.g., graphitize) the polycrystalline diamond of PCD bearing elements and may cause the bearing ring to warp. As the size of the bearing ring increases, the warping effect of the brazing process on the bearing ring may also increase, making very large bearing apparatuses difficult and costly to manufacture. Additionally, components of traditional bearing assemblies may be very costly and difficult to repair or replace. A worn or broken bearing ring must typically be entirely removed and replaced or sent to a separate facility for repair. If on-site repairs are an option, they are often difficult and costly; the difficulty and cost associated with such repairs is magnified as the size of the bearing apparatus increases.

SUMMARY

The instant disclosure is directed to exemplary bearing assemblies systems, bearing apparatuses, and methods for assembling a bearing assembly. According to at least one embodiment, a bearing assembly may comprise a support ring, a plurality of bearing-element carrier members coupled to the support ring, and a plurality of superhard bearing elements each having a lateral periphery extending between a base and a superhard bearing surface. At least one superhard bearing element of the plurality of superhard bearing elements may be attached to each of the plurality of bearing-element carrier members.

According to various embodiments, the plurality of bearing-element carrier members may be mechanically fastened to the support ring. For example, the bearing assembly may include a plurality of fasteners that mechanically fasten the plurality of bearing-element carrier members to the support ring, such as fasteners that extend through openings defined in the bearing-element carrier members. According to some embodiments, the plurality of bearing-element carrier members may be bonded to the support ring.

The plurality of bearing-element carrier members may be distributed circumferentially about a central axis. In some embodiments, the plurality of bearing-element carrier members may be coupled to a support surface of the support ring. The support surface of the support ring may face parallel to the central axis or may be oriented either radially inward or outward relative to the central axis. Each of the plurality of bearing-element carrier members may abut an adjacent one of the plurality of bearing-element carrier members. The support ring may comprise a continuous ring. The at least one superhard bearing element may comprise a polycrystalline diamond table. For example, the at least one superhard bearing element may comprise a polycrystalline diamond table that is bonded to a substrate. The polycrystalline diamond table may be at least partially leached.

According to various embodiments, a bearing apparatus may comprise a rotor and a stator. At least one of the rotor and the stator may include a support ring, a plurality of bearing-element carrier members coupled to the support ring, and a plurality of superhard bearing elements each having a lateral periphery extending between a base and a superhard bearing surface. At least one superhard bearing element of the plurality of superhard bearing elements may be attached to each of the plurality of bearing-element carrier members. The bearing apparatus may comprise a thrust-bearing apparatus or a radial bearing apparatus.

In some embodiments, a method for assembling a bearing assembly may comprise attaching at least one superhard bearing element to each of a plurality of bearing-element carrier members and coupling the plurality of bearing-element carrier members to a support ring. The method may further comprise replacing at least one of the plurality of bearing-element carrier members by removing the at least one bearing-element carrier member and coupling a replacement bearing-element carrier member to the support ring. Attaching the at least one superhard bearing element to each of the plurality of bearing-element carrier members may comprise brazing the at least one superhard bearing element to each of the plurality of bearing-element carrier members.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 3 is a cross-sectional perspective view of the thrust bearing assembly shown in FIG. 2.

Figure 1:
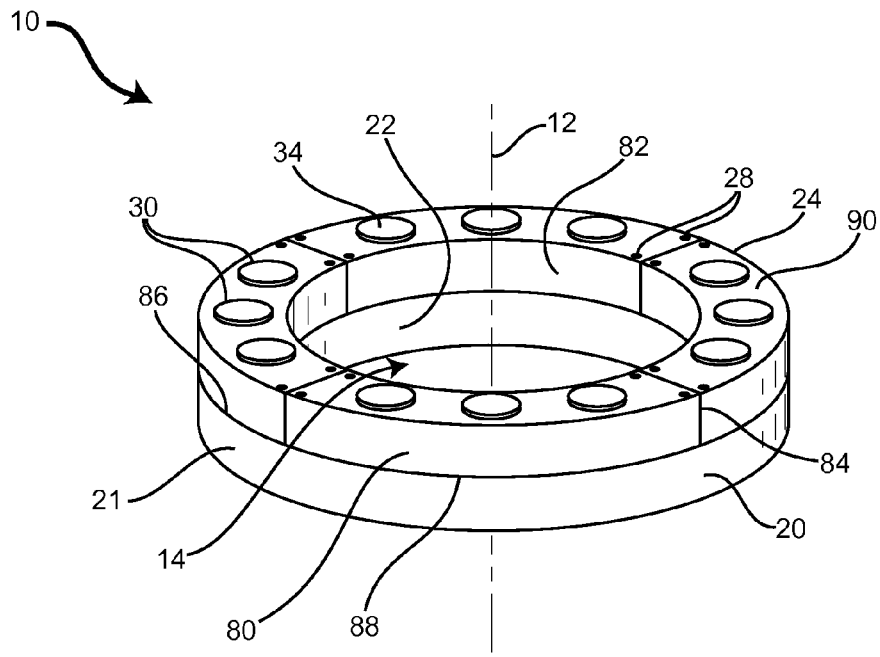
FIG. 1 is a perspective view of a thrust-bearing assembly according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure is directed to exemplary bearing assemblies and bearing apparatuses including superhard bearing elements. These bearing apparatuses may include radial bearings, thrust bearings, and other bearing apparatuses without limitation. Such bearing apparatuses may be used in a variety of applications, including subterranean drilling systems, directional drilling systems, turbine generators, wind mills, cranes, very large machinery and any other suitable applications, without limitation.

The terms "superabrasive" and "superhard," as used herein, may refer to any material having a hardness that is at least equal to a hardness of tungsten carbide. For example, a superhard article may represent an article of manufacture, at least a portion of which may exhibit a hardness that is equal to or greater than the hardness of tungsten carbide.

Figure 2:
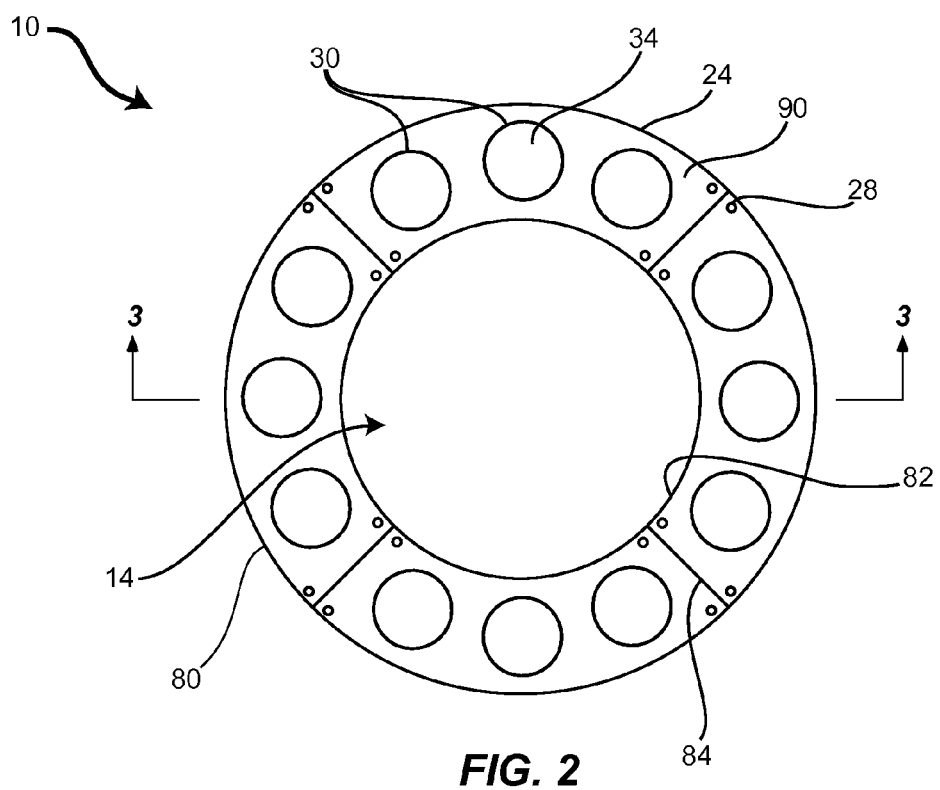
FIG. 2 is a top view of the thrust-bearing assembly shown in FIG. 1.

FIG. 1-4 illustrate an exemplary thrust-bearing assembly 10 according to at least one embodiment. As illustrated in FIGS. 1 and 2, thrust-bearing assembly 10 may comprise a plurality of bearing-element carrier members 24 coupled to a support ring 20. Both support ring 20 and bearing-element carrier members 24 are arranged circumferentially around a central axis 12 along which a thrust force may be generally directed during use. Central axis 12 may also comprise a rotational axis about which a portion of a bearing apparatus that includes thrust-bearing assembly 10 rotates. Thrust-bearing assembly 10 may include an aperture 14 configured to receive a shaft (e.g., a motor shaft). Aperture 14 may be generally centered about central axis 12.

The plurality of bearing-element carrier members 24 may be attached to a support surface 86 of support ring 20 by mechanical fastening, by bonding, by frictional engagement, by threaded attachment, and/or in any other suitable manner of attachment, without limitation. For example, the bearing-element carrier members 24 may be attached to support ring 20 by a plurality of fasteners (see fasteners 44 illustrated in FIG. 4) extending through fastener holes 28 defined in bearing-element carrier members 24 to support ring 20. In some embodiments, fasteners may extend through holes defined in support ring 20 and at least partially into corresponding holes defined in bearing-element carrier members 24. According to certain embodiments, bearing-element carrier members 24 may be bonded to support ring 20 through brazing, welding, adhesive bonding, and/or any other suitable bonding technique. Support ring 20 may include an outer peripheral surface 21 and an inner surface 22 that is configured to receive a shaft. As shown in FIGS. 1-4, each bearing-element carrier member 24 may contain multiple superhard bearing elements 30.

Each bearing-element carrier member 24 coupled to support ring 20 may have a mounting surface 88, an inner surface 82, an outer surface 80, a top surface 90 and side surfaces 84. When connected to support ring 20, the mounting surface 88 of each bearing-element carrier member 24 may abut a support surface 86 of support ring 20. Side surfaces 84 of bearing-element carrier members 24 may each abut a side surface 84 of an adjacent bearing-element carrier member 24. In some embodiments, a gap may be defined between side surfaces 84 of circumferentially adjacent bearing-element carrier members 24. Inner surface 82 and outer surface 80 of each bearing-element carrier member 24 may have any suitable shape, including, for example, a partial-toroidal shape generally matching the partial-toroidal shapes of inner surface 22 and/or outer peripheral surface 21 of the portion of support ring 20 where the particular bearing-element carrier member 24 is positioned.

Any suitable number of bearing-element carrier members 24 may be disposed about central axis 12. For example, FIGS. 1 and 2 show four bearing-element carrier members 24 positioned about central axis 12, each of the four bearing-element carrier members having substantially the same size and shape and holding the same number of superhard bearing elements 30. According to additional embodiments, thrust-bearing assembly 10 may comprise any other suitable number of bearing-element carrier members 24. Bearing-element carrier members 24 may also be formed to any other suitable shape and size and may be configured to hold any other suitable number of superhard bearing elements 30, without limitation. In certain embodiments, at least some of the plurality of bearing-element carrier members 24 forming thrust-bearing assembly 10 may comprise different shapes and/or sizes and/or may be configured to hold different numbers of superhard bearing elements 30.

FIG. 3 shows a cross-sectional view of thrust-bearing assembly 10. According to the illustrated embodiment, each bearing-element carrier member 24 may be configured to receive multiple superhard bearing elements 30 that may each be attached within a corresponding bearing-element recess 42 defined in bearing-element carrier member 24. Each superhard bearing element 30 may be disposed within the corresponding bearing-element recess 42 such that a base 40 of the superhard bearing element 30 is in at least partial contact with a bottom of the bearing-element recess 42. Each superhard bearing element 30 may be disposed within the corresponding bearing-element recess 42 so that a substrate 38 of the superhard bearing element 30 is surrounded by the bearing-element recess 42. Each superhard bearing element 30 may be oriented such that a superhard table 36 of the superhard bearing element 30 extends at least partially past top surface 90 of bearing-element carrier member 24 outside of the bearing-element recess 42. Each superhard bearing element 30 may be fixedly secured within the corresponding bearing-element recess 42 of a bearing-element carrier member 24 through brazing, press-fitting, threaded attachment, pin attachment, bonding, frictional engagement, and/or by any other suitable attachment technique, without limitation.

Figure 4:
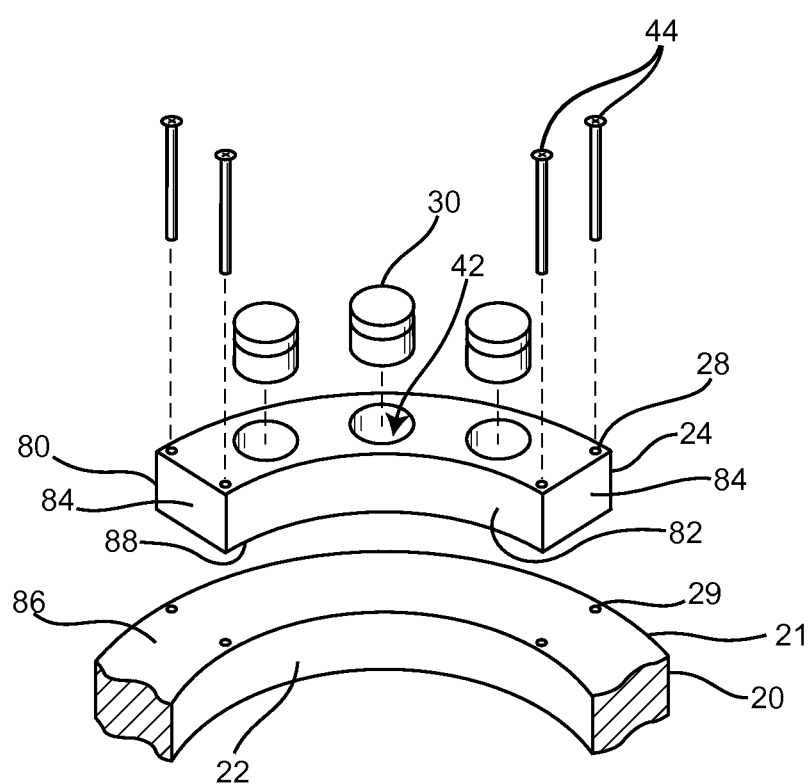
FIG. 4 is an exploded cut-away view of a portion of the thrust-bearing assembly shown in FIG. 1.

FIG. 4 shows an exploded cut-away view of a portion of the exemplary thrust-bearing bearing assembly 10 shown in FIGS. 1-3. As illustrated in FIG. 4, bearing-element carrier member 24 may be mounted and/or coupled to support surface 86 of support ring 20 by a plurality of fasteners 44. Superhard bearing elements 30 may be fixedly secured within bearing-element recesses 42 defined in bearing-element carrier member 24. Bearing-element carrier member 24, which includes bearing elements 30 attached therein, may be attached to support surface 86 of support ring 20. Bearing-element carrier member 24 may be attached and secured to support ring 20 by, for example, a plurality of fasteners 44 that extend through fastener holes 28 defined within bearing-element carrier member 24 and that further extend into fastener holes 29 defined in support ring 20. According to some embodiments, fasteners 44 (e.g., screws, rivets, pins, or bolts) may be affixed, bonded, or otherwise attached to support ring 20 (e.g., each fastener may have a threaded peripheral surface that engages a corresponding threaded surface defining at least a portion of fastener hole 29). Fasteners 44 may also be secured within fastener holes 28 and/or fastener holes 29 by any other suitable technique (e.g., rivets, pins, etc). For example, fasteners 44 may be secured within fastener holes 28 and/or fasteners holes 29 by frictional engagement (e.g., interference fitting), threaded attachment, brazing, bonding, or a combination of the above, without limitation.

Such a configuration may allow for faster and/or more efficient replacement of worn or damaged bearing parts, such as bearing-element carrier members 24 and/or superhard bearing elements 30 contained in bearing-element carrier members 24. For example, replacement of worn or damaged superhard bearing elements 30 and bearing-element carrier members 24 may be accomplished without disassembling the entire thrust bearing assembly 10. Such a configuration may also make it unnecessary to provide an entirely new bearing assembly to replace a worn or damaged part. Additionally, repair and replacement of portions of thrust-bearing assembly 10 may be accomplished on-site, thereby obviating the need to send entire rotors, stators, or bearing assemblies to a repair location for various repairs.

In some embodiments, bearing-element carrier members 24 may be mounted and/or coupled to a support ring 20 following attachment of superhard bearing elements 30 to bearing-element carrier members 24. By attaching superhard bearing elements 30 to individual bearing-element carrier members 24 prior to coupling bearing-element carrier members 24 to support ring 20, a risk of thermal warping of thrust-bearing assembly 10 during brazing of superhard bearing elements 30 to bearing-element carrier members 24 may be reduced or prevented. Further, bearing-element carrier members 24 may enable generally larger thrust-bearing assemblies 10 to be manufactured since the size of thrust-bearing assembly 10 may not limited due warping defects during manufacturing and/or by the size of conventional brazing apparatuses. As such, manufacturing of thrust-bearing assembly 10 comprising bearing-element carrier members 24 may enable production of relatively larger and/or more versatile bearing assemblies that are useful in various applications, including large-scale machinery applications.

Support ring 20 and bearing-element carrier members 24 may be made from a variety of different materials. For example, support ring 20 and/or bearing-element carrier members 24 may comprise a metallic material (e.g., carbon steel, tungsten or tungsten alloys, aluminum or aluminum alloys, or stainless steel, etc.), a carbide material (e.g., tungsten carbide, silicon carbide, etc.), or another suitable material. In some embodiments, the bearing-element carrier members may be made of a material with relatively high thermal conductivity (e.g., tungsten carbide or cobalt-cemented tungsten carbide) and the superhard bearing elements 30 may abut or contact the bearing-element carrier members 24 over a substantial surface area of the superhard bearing element 30 in order to promote heat transfer from the superhard bearing element 30 to the bearing-element carrier member 24.

In some embodiments, support ring 20 and/or bearing-element carrier members 24 may include an erosion-resistant and/or abrasion-resistant coating applied thereto. For example, an erosion-resistant and abrasion resistant coating may include a coating including, for example, a urethane rubber or other suitable coating, without limitation. In other embodiments, a hardfacing coating (e.g., tungsten carbide hardfacing) may be applied to support ring 20 and/or bearing-element carrier members 24 by any suitable method, including, without limitation, flame spraying, welding HVOF (high velocity oxy-fuel coating spraying), and/or laser cladding.

Figure 5:
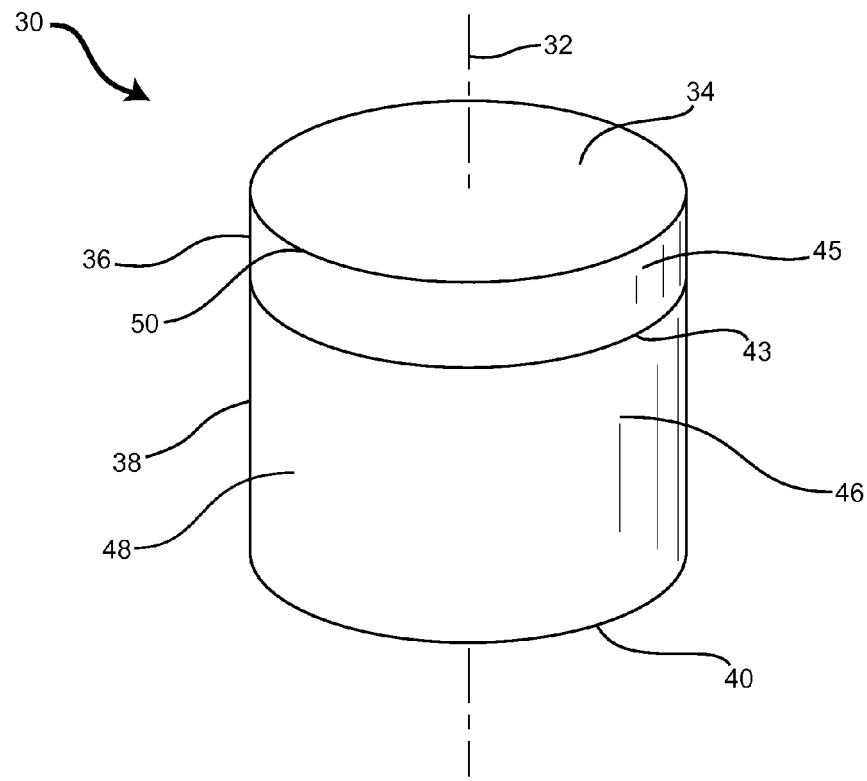
FIG. 5 is a perspective view of an exemplary superhard bearing element including a substrate and a superhard table according to at least one embodiment.
Figure 6:
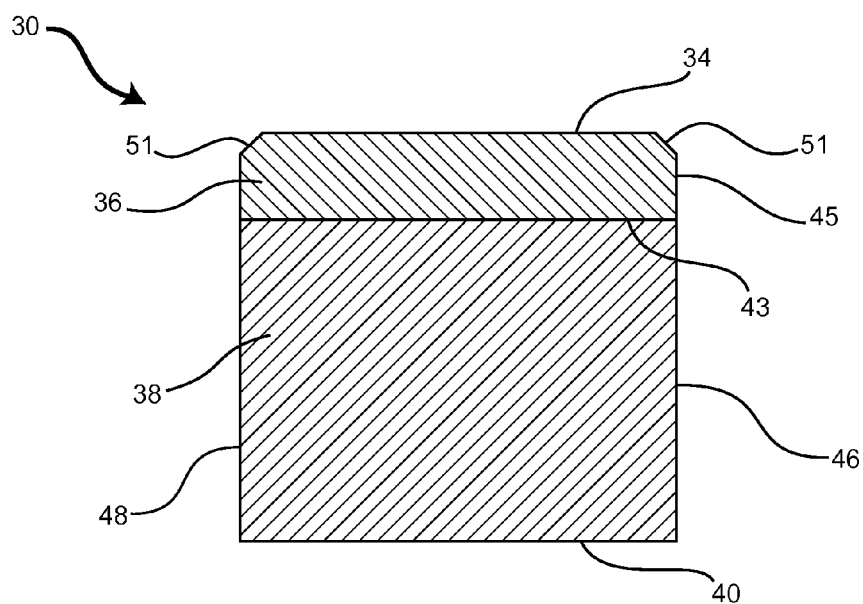
FIG. 6 is a cross-sectional side view of the exemplary superhard bearing element shown in FIG. 5.

FIGS. 5 and 6 illustrate an exemplary superhard bearing element 30 according to at least one embodiment. As illustrated in FIGS. 5 and 6, superhard bearing element 30 may comprise a superhard table 36 affixed to or formed upon a substrate 38. Superhard table 36 may be affixed to substrate 38 at interface 43. Superhard bearing element 30 may comprise a rear surface 40, a superhard face 34, and an element side surface 46. In some embodiments, element side surface 46 may include a substrate side surface 48 formed by substrate 38 and a superhard side surface 45 formed by superhard table 36. Rear surface 40 may be formed by substrate 38.

Superhard bearing element 30 may also comprise a superhard face 34 and an edge 50 at the intersection of superhard side surface 45 and superhard face 34. Edge 50 may comprise an angular and/or rounded edge formed at the intersection of superhard side surface 45 and superhard face 34. In some embodiments, a chamfer 51 (i.e., sloped or angled as shown in FIG. 6) may be formed by superhard table 36 at the intersection of superhard side surface 45 and superhard face 34. Any other suitable surface shape may also be formed at the intersection of superhard side surface 45 and superhard face 34, including, without limitation, an arcuate surface (e.g., a radius, an ovoid shape, or any other rounded shape), a sharp edge, multiple chamfers/radii, a honed edge, and/or combinations of the foregoing.

Superhard bearing element 30 may comprise any suitable size, shape, and/or geometry, without limitation. According to at least one embodiment, at least a portion of superhard bearing element 30 may have a substantially cylindrical shape. For example, superhard bearing element 30 may comprise a substantially cylindrical outer surface surrounding a central axis 32 extending through superhard bearing element 30, as illustrated in FIGS. 5 and 6. For example, substrate side surface 48 and superhard side surface 45 may be substantially cylindrical and may have any suitable diameters relative to central axis 32, without limitation. According to various embodiments, substrate side surface 48 and superhard side surface 45 may have substantially the same outer diameter relative to central axis 32. In addition, although the superhard bearing surface 34 is shown as being generally planar, in some embodiments, the superhard bearing surface 34 may be convex or concave.

Substrate 38 may comprise any suitable material on which superhard table 36 may be formed. In at least one embodiment, substrate 38 may comprise a cemented carbide material, such as a cobalt-cemented tungsten carbide material and/or any other suitable material. In some embodiments, substrate 38 may include a suitable metal-solvent catalyst material, such as, for example, cobalt, nickel, iron, and/or alloys thereof. Substrate 38 may also include any suitable material including, without limitation, cemented carbides such as titanium carbide, niobium carbide, tantalum carbide, vanadium carbide, chromium carbide, and/or combinations of any of the preceding carbides cemented with iron, nickel, cobalt, and/or alloys thereof. Superhard table 36 may be formed of any suitable superabrasive and/or superhard material or combination of materials, including, for example PCD. According to additional embodiments, superhard table 36 may comprise cubic boron nitride, silicon carbide, polycrystalline diamond, and/or mixtures or composites including one or more of the foregoing materials, without limitation.

Superhard table 36 may be formed using any suitable technique. According to some embodiments, superhard table 36 may comprise a PCD table fabricated by subjecting a plurality of diamond particles to an HPHT sintering process in the presence of a metal-solvent catalyst (e.g., cobalt, nickel, iron, or alloys thereof) to facilitate intergrowth between the diamond particles and form a PCD body comprised of bonded diamond grains that exhibit diamond-to-diamond bonding therebetween. For example, the metal-solvent catalyst may be mixed with the diamond particles, infiltrated from a metal-solvent catalyst foil or powder adjacent to the diamond particles, infiltrated from a metal-solvent catalyst present in a cemented carbide substrate, or combinations of the foregoing. The bonded diamond grains (e.g., sp3-bonded diamond grains), so-formed by HPHT sintering the diamond particles, define interstitial regions with the metal-solvent catalyst disposed within the interstitial regions of the as-sintered PCD body. The diamond particles may exhibit a selected diamond particle size distribution.

Following sintering, various materials, such as a metal-solvent catalyst, remaining in interstitial regions within the as-sintered PCD body may reduce the thermal stability of superhard table 36 at elevated temperatures. In some examples, differences in thermal expansion coefficients between diamond grains in the as-sintered PCD body and a metal-solvent catalyst in interstitial regions between the diamond grains may weaken portions of superhard table 36 that are exposed to elevated temperatures, such as temperatures developed during bearing operation. The weakened portions of superhard table 36 may become excessively worn and/or damaged during bearing operation.

Removing the metal-solvent catalyst and/or other materials from the as-sintered PCD body may improve the heat resistance and/or thermal stability of superhard table 36, particularly in situations where the PCD material may be exposed to elevated temperatures. A metal-solvent catalyst and/or other materials may be removed from the as-sintered PCD body using any suitable technique, including, for example, leaching. In at least one embodiment, a metal-solvent catalyst, such as cobalt, may be removed from regions of the as-sintered PCD body, such as regions adjacent to the working surfaces of superhard table 36. Removing a metal-solvent catalyst from the as-sintered PCD body may reduce damage to the PCD material of superhard table 36 caused by expansion of the metal-solvent catalyst.

At least a portion of a metal-solvent catalyst, such as cobalt, as well as other materials, may be removed from at least a portion of the as-sintered PCD body using any suitable technique, without limitation. For example, chemical and/or gaseous leaching may be used to remove a metal-solvent catalyst from the as-sintered PCD body up to a desired depth from a surface thereof. The as-sintered PCD body may be leached by immersion in an acid, such as aqua regia, nitric acid, hydrofluoric acid, or subjected to another suitable process to remove at least a portion of the metal-solvent catalyst from the interstitial regions of the PCD body and form superhard table 36 comprising a PCD table. For example, the as-sintered PCD body may be immersed in or exposed to the acid for about 2 to about 7 days (e.g., about 3, 5, or 7 days) or for a few weeks (e.g., about 4 weeks) depending on the process employed.

Even after leaching, a residual, detectable amount of the metal-solvent catalyst may be present in the at least partially leached superhard table 36. It is noted that when the metal-solvent catalyst is infiltrated into the diamond particles from a cemented tungsten carbide substrate including tungsten carbide particles cemented with a metal-solvent catalyst (e.g., cobalt, nickel, iron, or alloys thereof), the infiltrated metal-solvent catalyst may carry tungsten and/or tungsten carbide therewith and the as-sintered PCD body may include such tungsten and/or tungsten carbide therein disposed interstitially between the bonded diamond grains. The tungsten and/or tungsten carbide may be at least partially removed by the selected leaching process or may be relatively unaffected by the selected leaching process.

In some embodiments, only selected portions of the as-sintered PCD body may be leached, leaving remaining portions of resulting superhard table 36 unleached. For example, some portions of one or more surfaces of the as-sintered PCD body may be masked or otherwise protected from exposure to a leaching solution and/or gas mixture while other portions of one or more surfaces of the as-sintered PCD body may be exposed to the leaching solution and/or gas mixture. Other suitable techniques may be used for removing a metal-solvent catalyst and/or other materials from the as-sintered PCD body or may be used to accelerate a chemical leaching process. For example, exposing the as-sintered PCD body to heat, pressure, electric current, microwave radiation, and/or ultrasound may be employed to leach or to accelerate a chemical leaching process, without limitation. Following leaching, superhard table 36 may comprise a volume of PCD material that is substantially free of a metal-solvent catalyst.

The plurality of diamond particles used to form superhard table 36 comprising the PCD material may exhibit one or more selected sizes. The one or more selected sizes may be determined, for example, by passing the diamond particles through one or more sizing sieves or by any other method. In an embodiment, the plurality of diamond particles may include a relatively larger size and at least one relatively smaller size. As used herein, the phrases "relatively larger" and "relatively smaller" refer to particle sizes determined by any suitable method, which differ by at least a factor of two (e.g., 40 µm and 20 µm). More particularly, in various embodiments, the plurality of diamond particles may include a portion exhibiting a relatively larger size (e.g., 100 µm, 90 µm, 80 µm, 70 µm, 60 µm, 50 µm, 40 µm, 30 µm, 20 µm, 15 µm, 12 µm, 10 µm, 8 µm) and another portion exhibiting at least one relatively smaller size (e.g., 30 µm, 20 µm, 15 µm, 12

μm, 10 μm, 8 μm, 4 μm, 2 μm, 1 μm, 0.5 μm, less than 0.5 μm, 0.1 μm, less than 0.1 μm). In another embodiment, the plurality of diamond particles may include a portion exhibiting a relatively larger size between about 40 μm and about 15 μm and another portion exhibiting a relatively smaller size between about 12 μm and 2 μm. Of course, the plurality of diamond particles may also include three or more different sizes (e.g., one relatively larger size and two or more relatively smaller sizes) without limitation.

Figure 7:
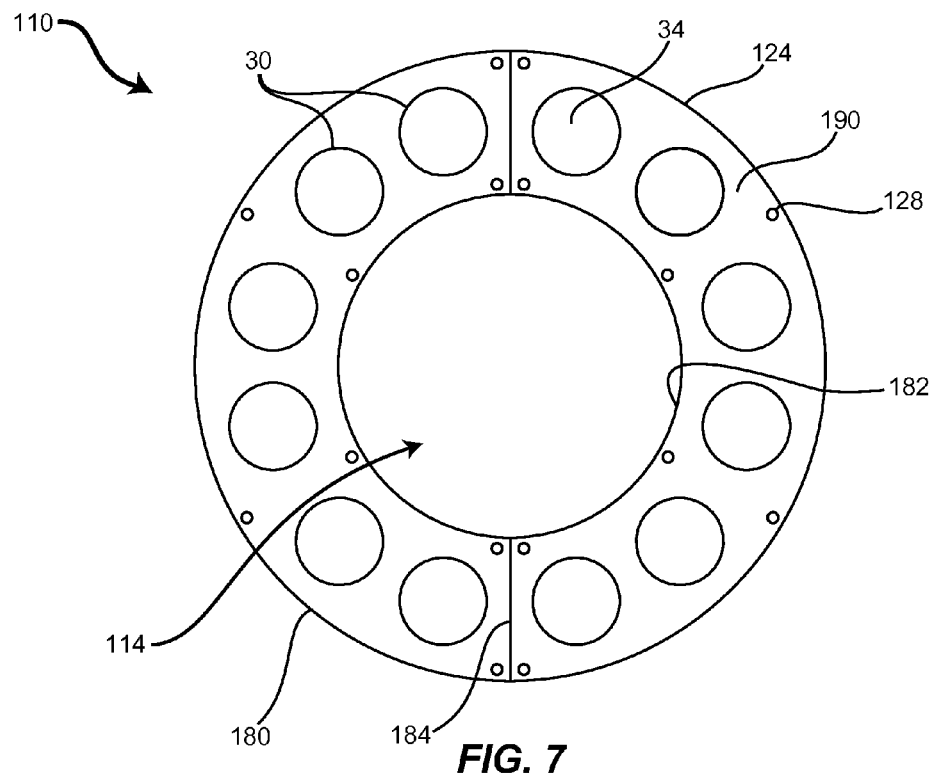
FIG. 7 is a top view of a thrust-bearing assembly according to at least one embodiment.
Figure 8:
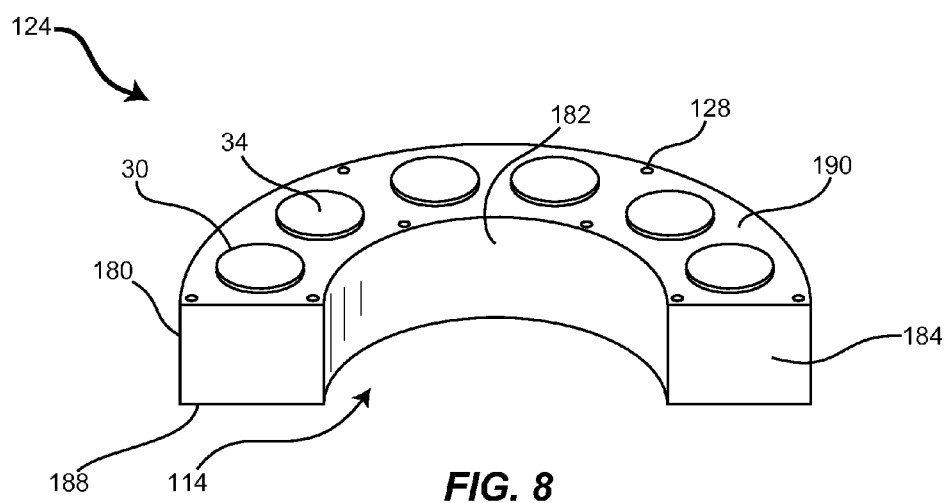
FIG. 8 is a perspective view of a bearing element carrier comprising part of the thrust-bearing assembly shown in FIG. 7.

FIGS. 7 and 8 illustrate a thrust-bearing assembly 110 according to various embodiments. As illustrated in FIGS. 7 and 8, thrust-bearing assembly 110 may include two bearing-element carrier members 124. Thrust-bearing assembly 110 may comprise any suitable shape or configuration, such as, for example a semi-circular or partial-circular periphery. Thrust-bearing assembly 110 may include an aperture 114 configured to receive a shaft (e.g., a motor shaft). Each bearing-element carrier member 124 may be configured to hold a plurality of super hard bearing elements 30, each having a superhard bearing surface 34.

Each bearing-element carrier member 124 may have a mounting surface 188, an inner surface 182, an outer surface 180, a top surface 190, and side surfaces 184. Bearing-element carrier members 124 may be mounted and/or coupled to a support ring (e.g., support ring 20 illustrated in FIG. 1) at mounting surfaces 188. The side surfaces 184 of bearing-element carrier members 124 may each abut a side surface 184 of an adjacent bearing-element carrier member 124. Each of inner surface 182 and outer surface 180 of each bearing-element carrier member 124 may have any suitable shape, including, for example, a half-toroidal or partial-toroidal shape that generally matches contours of an adjacent inner surface portion and/or outer peripheral surface portion of a support ring to which the particular bearing-element carrier member 124 is attached. Additionally, each bearing-element carrier member 124 may be attached to a support ring by fasteners (e.g., screws, rivets, pins, or bolts) extending through holes 128, and/or by any other suitable manner of attachment (e.g., welding, mechanically capturing, brazing, etc.), without limitation.

Figure 9:
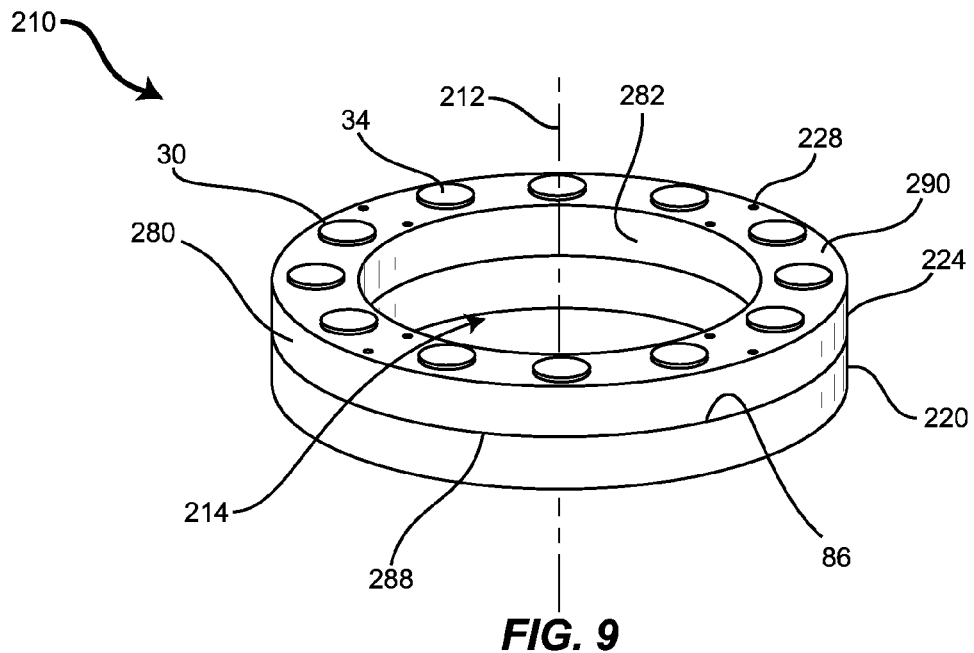
FIG. 9 is a perspective view of a thrust-bearing assembly according to at least one embodiment.
Figure 10:
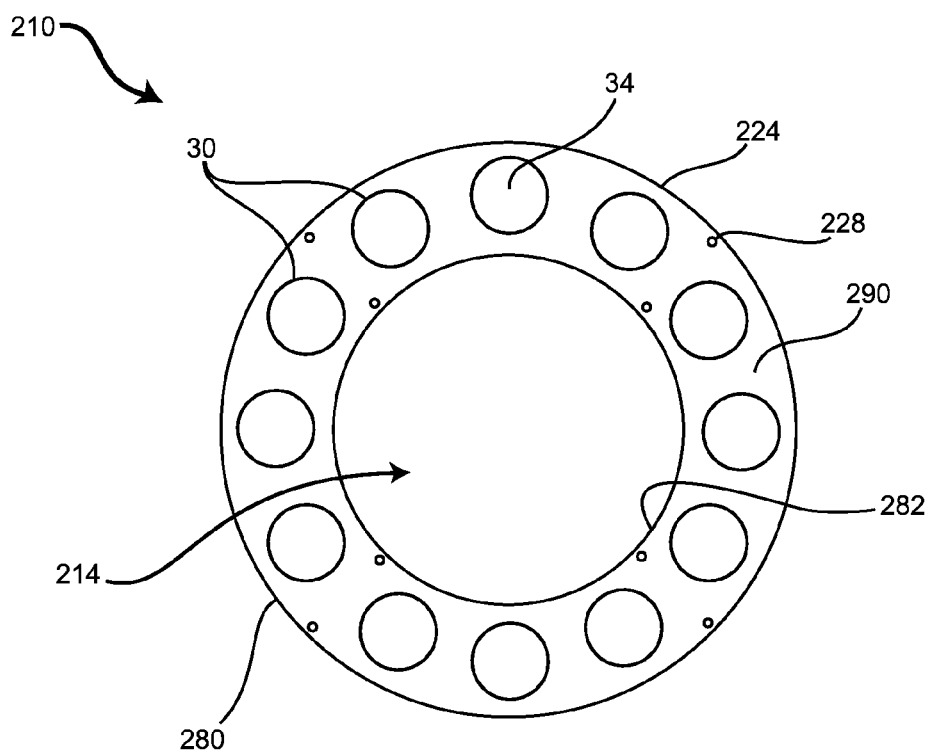
FIG. 10 is a top view of the thrust-bearing assembly shown in FIG. 9.

FIGS. 9 and 10 illustrate a thrust-bearing assembly 210 according to various embodiments. As illustrated in FIGS. 9 and 10, thrust-bearing assembly 210 may comprise a single ring-shaped bearing-element carrier member 224 having an aperture 214 configured to receive a shaft (e.g., a motor shaft). Bearing element carrier member 224 may be configured to hold a plurality of superhard bearing elements 30 spaced circumferentially around central axis 212.

Bearing-element carrier member 224 may have a mounting surface 288, an inner surface 282, an outer surface 280, and a top surface 290. Bearing-element carrier member 224 may be mounted and/or coupled to a support ring 220 at mounting surface 288. According to at least one embodiment, each of inner surface 282 and outer surface 280 of bearing-element carrier member 224 may have a cylindrical shape that generally matches contours of an adjacent inner surface portion and/or outer peripheral surface portion of support ring 220. Bearing-element carrier member 224 may be attached to support ring 220 by fasteners (e.g., screws, rivets, pins, or bolts) extending through holes 228, and/or by any other suitable manner of attachment (e.g., welding, mechanically capturing, brazing, etc.), without limitation.

Figure 11:
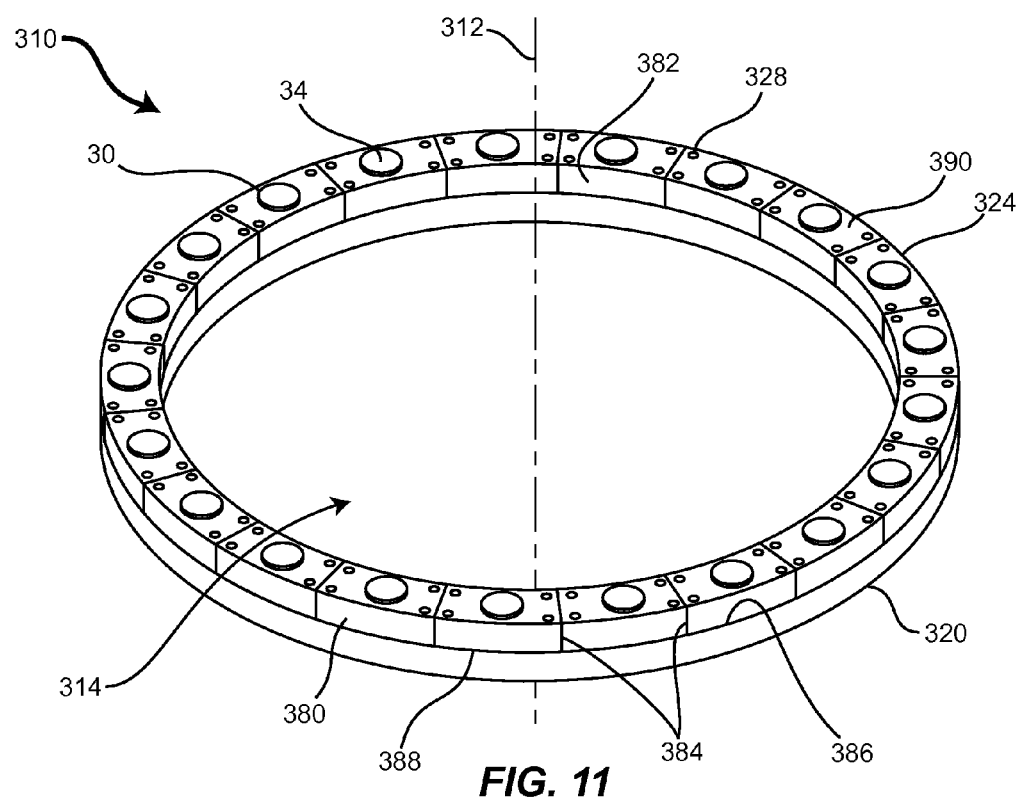
FIG. 11 is a perspective view of a thrust-bearing assembly according to at least one embodiment.

FIG. 11 shows a thrust-bearing assembly 310 according to some embodiments. As illustrated in FIG. 11 thrust-bearing assembly 310 may include a plurality of bearing-element carrier members 324. Thrust-bearing assembly 310 may include an aperture 314 configured to receive a shaft (e.g., a motor shaft). Each bearing-element carrier member 324 may be configured to hold at least one superhard bearing element 30 having a superhard bearing surface 34. For example, as shown in FIG. 11, a single bearing element 30 may be attached to each bearing-element carrier member 324.

Each bearing-element carrier member 324 may have a mounting surface 388, an inner surface 382, an outer surface 380, a top surface 390, and side surfaces 384. Mounting surfaces 388 of bearing-element carrier members 324 may be mounted and/or coupled to a support surface 386 of a support ring 320. Support ring 320 and the bearing-element carrier members 324 may be arranged circumferentially around a central axis 312. The side surfaces 384 of bearing-element carrier members 324 may each abut a side surface 384 of an adjacent bearing-element carrier member 324. Each of inner surface 382 and outer surface 380 of each bearing-element carrier member 324 may have any suitable shape, including, for example, a partial-toroidal shape that generally matches contours of an adjacent inner surface portion and/or outer peripheral surface portion of support ring 320. Additionally, each bearing-element carrier member 324 may be attached to support ring 320 by fasteners (e.g., screws, rivets, pins, or bolts) extending through holes 328, and/or by any other suitable manner of attachment (e.g., welding, mechanically capturing, brazing, etc.), without limitation.

Figure 12:
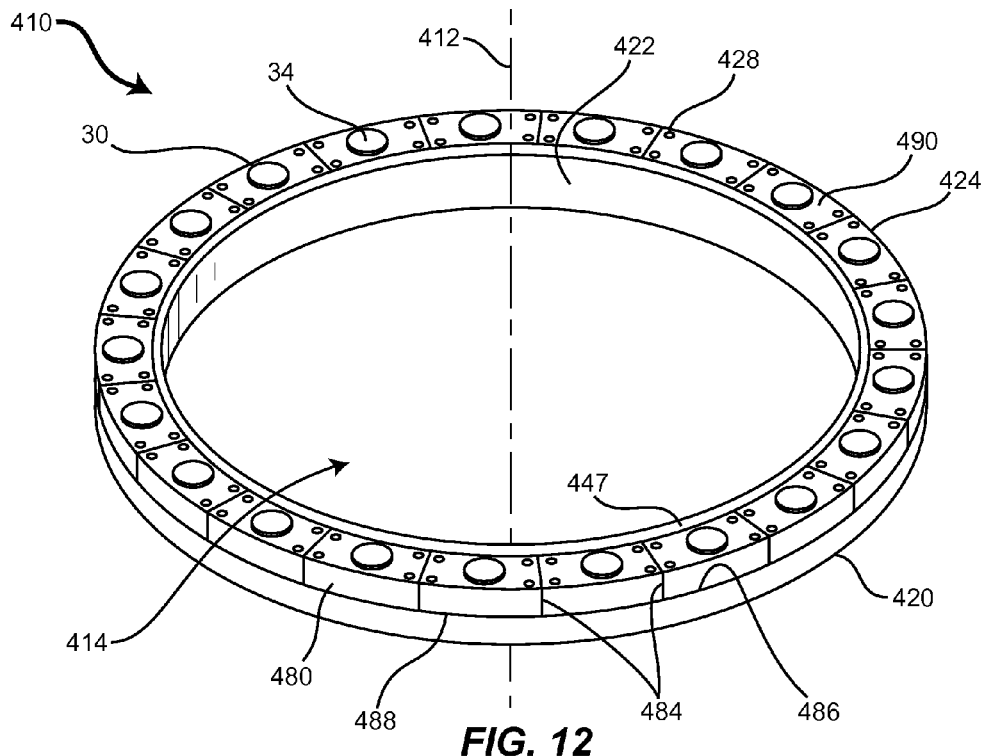
FIG. 12 is a perspective view of a thrust-bearing assembly according to at least one embodiment.
Figure 13:
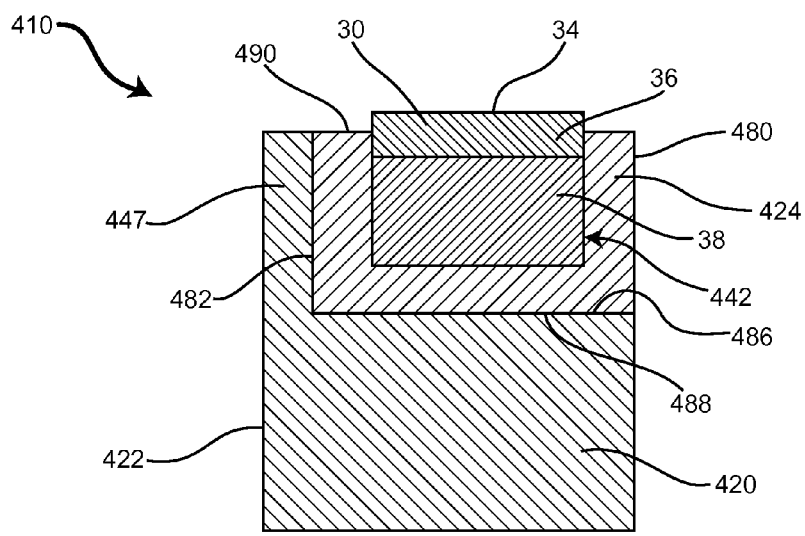
FIG. 13 is a cross-sectional view of a portion of the thrust-bearing assembly shown in FIG. 12.

FIGS. 12 and 13 illustrate a thrust-bearing assembly 410 according to some embodiments. As illustrated in FIG. 12, thrust-bearing assembly 410 may comprise a support ring 420 having a flange 447 extending from a support surface 486 thereof. Flange 447 may facilitate attachment and alignment of bearing-element carrier members 424 with respect to support ring 420. For example, flange 447 may be disposed about an interior portion of support ring 420. In additional examples, flange 447 may be disposed about an outer peripheral portion of support ring 420. Flange 447 may extend to any suitable height from support surface 486, without limitation. For example, in an embodiment shown in the cross-sectional view of FIG. 13, flange 447 may have a height that is substantially the same as a height of the bearing-element carrier members 424. In some embodiments, flange 447 may be integrally formed with support ring 420. Flange 447 may include an inner surface 422 defining an aperture 414 that may receive a shaft (e.g., a motor shaft) or other suitable element. Aperture 414 may be generally centered about a central axis 412.

Each bearing-element carrier member 424 may have a mounting surface 488, an inner surface 482, an outer surface 480, a top surface 490, and side surfaces 484. Mounting surfaces 488 of bearing-element carrier members 424 may be mounted and/or coupled to a support surface 486 of a support ring 420. Bearing-element carrier members 424 may be arranged circumferentially around central axis 412. The side surfaces 484 of bearing-element carrier members 424 may each abut a side surface 484 of an adjacent bearing-element carrier member 424. Inner surface 482 of each bearing-element carrier member 424 may have any suitable shape, including, for example, a partial-toroidal shape or other suitable shape that abuts and/or conforms to an adjacent surface of flange 477. Additionally, outer surface 480 of each bearing-element carrier member 424 may have any suitable shape, including, for example, a partial-toroidal shape that generally matches a contour of an outer peripheral surface portion of support ring 420. Additionally, each bearing-element carrier member 424 may be attached to support ring 420 by fasteners (e.g., screws, rivets, pins, or bolts) extending through holes 428, and/or by any other suitable manner of attachment (e.g., welding, mechanically capturing, brazing, etc.), without limitation.

Figure 14:
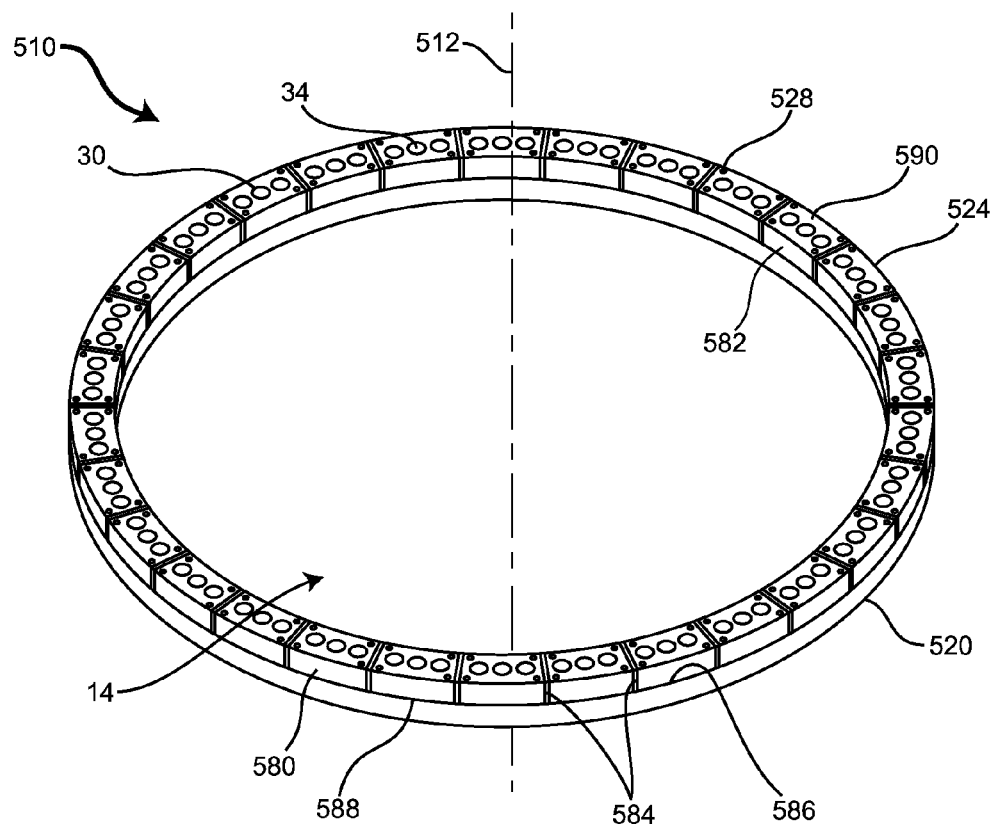
FIG. 14 is a perspective view of a thrust-bearing assembly according to at least one embodiment.

FIG. 14 illustrates a thrust-bearing assembly 510 according to some embodiments. As illustrated in FIG. 14, a plurality of bearing-element carrier members 524 may be mounted and/or coupled to a support ring 520. Each bearing-element carrier member 524 may be configured to hold multiple superhard bearing elements 30. Bearing-element carrier members 524 may be arranged on mounting surface 586 of support ring 520 in a generally circular configuration around central axis 512.

Each bearing-element carrier member 524 may have a mounting surface 588, an inner surface 582, an outer surface 580, a top surface 590, and side surfaces 584. Mounting surfaces 588 of bearing-element carrier members 524 may be mounted and/or coupled to support surface 586 of a support ring 520. Support ring 520 and bearing-element carrier members 524 may be arranged circumferentially around a central axis 512. The side surfaces 584 of bearing-element carrier members 524 may each abut a side surface 584 of an adjacent bearing-element carrier member 524. Each of inner surface 582 and outer surface 580 of each bearing-element carrier member 524 may have any suitable shape, including, for example, a partial-toroidal shape that generally matches contours of an adjacent inner surface portion and/or outer peripheral surface portion of support ring 520. Additionally, each bearing-element carrier member 524 may be attached to support ring 520 by fasteners (e.g., screws, rivets, pins, or bolts) extending through holes 528, and/or by any other suitable manner of attachment (e.g., welding, mechanically capturing, brazing, etc.), without limitation.

Figure 15:
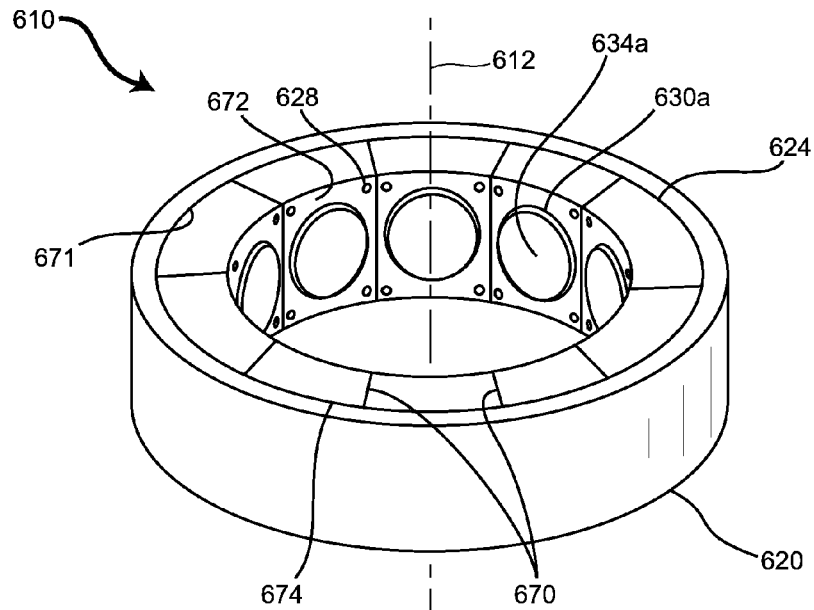
FIG. 15 is a perspective view of an outer ring of a radial-bearing assembly according to at least one embodiment.
Figure 16:
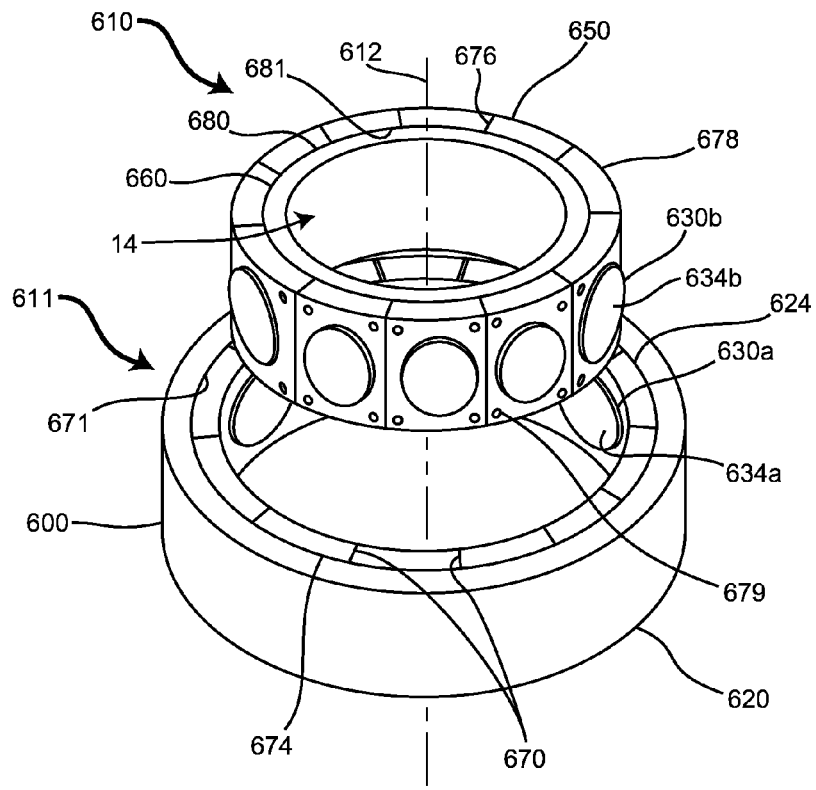
FIG. 16 is a perspective view of an outer ring and an inner ring of a radial-bearing assembly according to at least one embodiment.

FIGS. 15 and 16 illustrate radial-bearing assemblies according to at certain embodiments. The radial-bearing assembly 600 illustrated in FIG. 15 may comprise, for example, an outer race 611 of a radial-bearing apparatus. Outer race 611 may include an outer radial support ring 620 having a support surface 671. A plurality of bearing-element carrier members 624 holding superhard bearing elements 630a having superhard bearing surfaces 634a may be coupled to radial support ring 620 of outer race 611. Superhard bearing surfaces 634a may each comprise any suitable surface shape, such as, for example, a concave surface and/or a generally planar surface shape. Bearing-element carrier members 624 and outer radial support ring 620 may be generally centered about a central axis 612.

Bearing-element carrier members 624 may be mounted and/or coupled to outer radial support ring 620 in any suitable manner (see, e.g., FIGS. 1-4). In some embodiments, bearing-element carrier members 624 may be attached to support surface 671 of outer radial support ring 620 by mechanical fastening, by bonding, by frictional engagement, by threaded attachment, and/or by any other suitable manner of attachment, without limitation. For example, fasteners (e.g., screws, rivets, pins, or bolts) may extend through fastener holes 628 defined in bearing-element carrier members 624 and at least partially into corresponding holes defined in outer radial support ring 620. In some embodiments, fasteners may extend through holes defined in outer radial support ring 620 and at least partially into corresponding holes defined in bearing-element carrier members 624. Bearing-element carrier members 624 may also be bonded to outer radial support ring 620 through brazing, welding, adhesive bonding, and/or any other suitable bonding technique.

Each bearing-element carrier member 624 may have side surfaces 670, an inner surface 672, and a mounting surface 674, which is in contact with support surface 671 of outer radial support ring 620. At least one superhard bearing element 630a may partially protrude from inner surface 672 of each bearing-element carrier member 624. Mounting surface 674 of each bearing-element carrier member 624 may have any suitable shape, without limitation. For example, as shown in FIG. 15, mounting surfaces 674 may each have a partial-toroidal shape corresponding to an adjacent portion of support surface 671 of outer radial support ring 620. Inner surfaces 672 of bearing-element carrier members 624 may also each comprise any suitable surface shape, including, for example, a partial-toroidal shape.

As illustrated in FIG. 16, a radial bearing assembly comprising an inner race 610 may include an inner radial support ring 660 and a plurality of bearing-element carrier members 650 coupled to inner radial support ring 660. Bearing-element carrier members 650 may each contain at least one superhard bearing element 630b having a superhard bearing surface 634b. Superhard bearing surfaces 634b may each comprise any suitable surface shape, such as, for example, a convex surface and/or a generally planar surface shape. Bearing-element carrier members 650 and outer radial support ring 620 may be generally centered about central axis 612.

Bearing-element carrier members 650 may be coupled to inner radial support ring 660 in any suitable manner. In some embodiments, bearing-element carrier members 650 may be attached to a support surface 680 of inner radial support ring 660 by mechanical fastening, by bonding, by frictional engagement, by threaded attachment, and/or by any other suitable manner of attachment, without limitation. For example, fasteners may extend through fastener holes 679 defined in bearing-element carrier members 650 and at least partially into corresponding holes defined in inner radial support ring 660. In some embodiments, fasteners may extend through holes defined in inner radial support ring 660 and at least partially into corresponding holes defined in bearing-element carrier members 650. Bearing-element carrier members 650 may also be bonded to inner radial support ring 660 through brazing, welding, adhesive bonding, and/or any other suitable bonding technique.

Each bearing-element carrier member 650 may have side surfaces 676, an outer surface 678, and a mounting surface 681, which is in contact with support surface 680 of inner radial support ring 660. At least one superhard bearing element 630b may partially protrude from outer surface 678 of each bearing-element carrier member 650. Mounting surface 681 of each bearing-element carrier member 650 may have any suitable shape, without limitation. For example, as shown in FIG. 16, mounting surfaces 681 may each have a partial-toroidal shape corresponding to an adjacent portion of support surface 680 of inner radial support ring 660. Outer surfaces 678 of bearing-element carrier members 650 may also each comprise any suitable surface shape, including, for example, a partial-toroidal shape.

Either of outer race 611 and inner race 610 may be configured as a rotor or a stator, respectively. If, for example, inner race 610 is configured to remain stationary, inner race 610 may be referred to as the stator and the outer race 611 may be referred to as the rotor that rotates about central axis 612.

Figure 17:
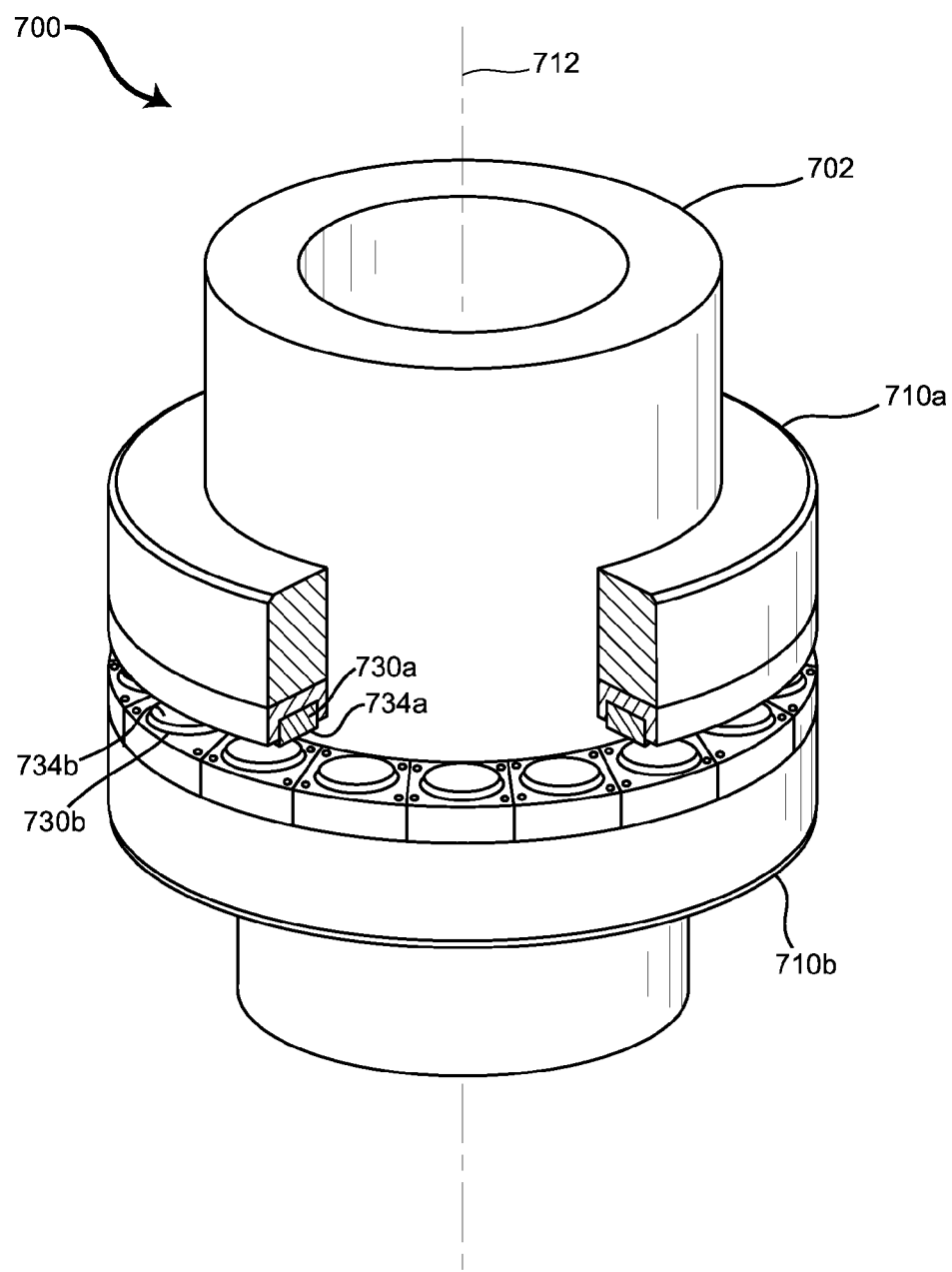
FIG. 17 is a perspective view of a thrust-bearing apparatus according to at least one embodiment.

Any of the previously described thrust-bearing assemblies and radial bearing assemblies may be used in a bearing apparatus that employs two bearing assemblies, at least one of which may be configured as any of the previously described bearing assemblies. FIG. 17 is a perspective view of a rotating apparatus 700 according to at least one embodiment. In the illustrated rotating apparatus 700, two thrust bearing assemblies 710a and 710b (see, e.g., FIGS. 1-14) may be employed together as a rotor and a stator. Any of the thrust bearing assemblies or radial bearing assemblies disclosed herein may be used in rotating apparatus 700, without limitation.

According to an embodiment, thrust-bearing assembly 710*a* may act as a rotor. Thrust-bearing assembly 710*a* may be attached to and rotate with a shaft 702. Shaft 702 may be operably coupled to a motor or any other apparatus capable of rotating shaft 702 in a counter clockwise or clockwise direction around a central axis 712. The thrust-bearing assembly 710*a* may be coupled to shaft 702 through press-fitting and/or any by other suitable manner of connection, without limitation. Thrust-bearing assembly 710*b*, which is not connected to shaft 702, may function as a stator that remains stationary while thrust-bearing assembly 710*a* rotates. Bearing surfaces 734*a* of rotor-side superhard bearing elements 730*a* may oppose and bear against bearing surfaces 734*b* of stator-side superhard bearing elements 730*b*.

Figure 18:
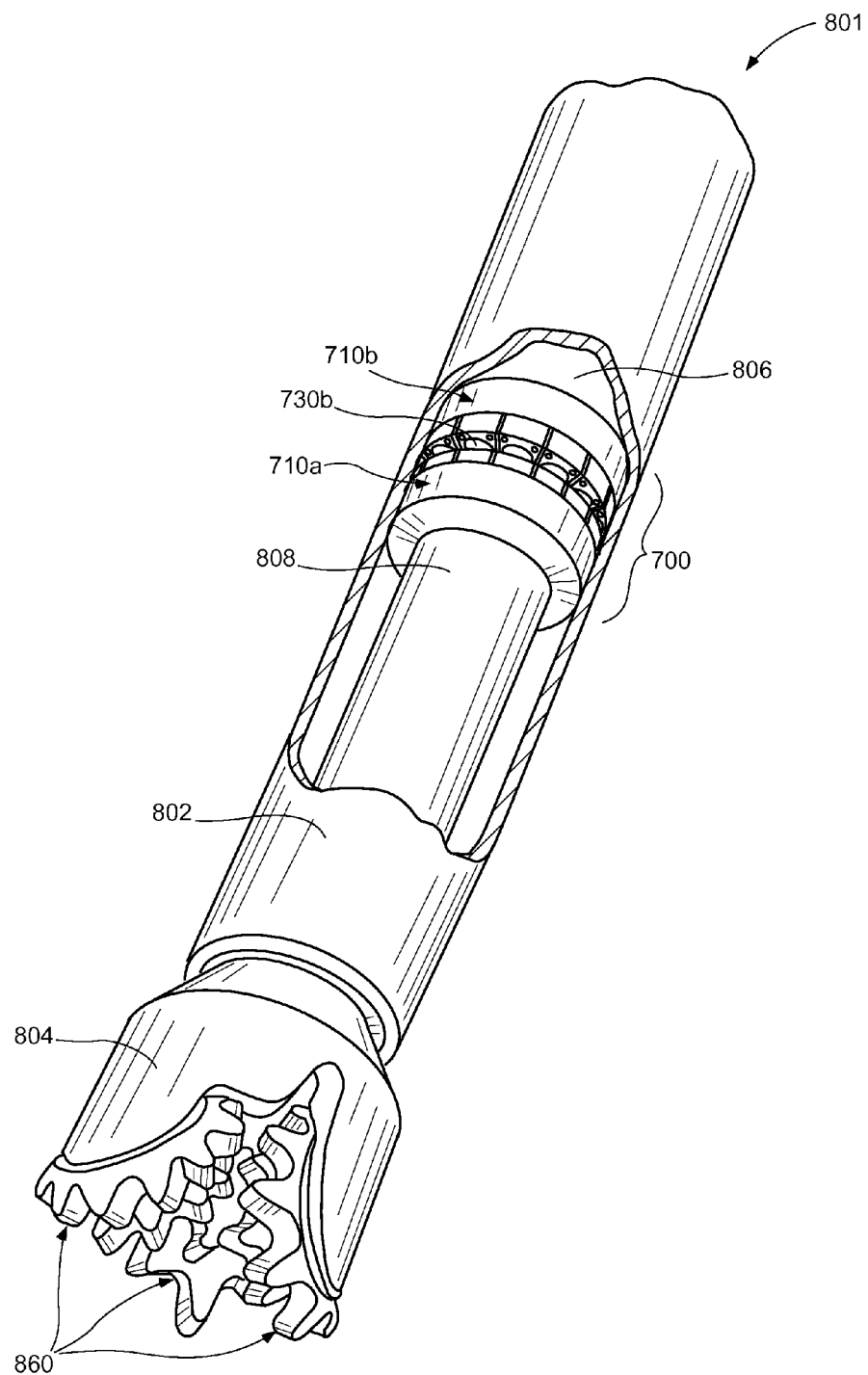
FIG. 18 is a partial cut-away perspective view of an exemplary subterranean drilling system according to at least one embodiment.

FIG. 18 is a partial cross-sectional perspective view of an exemplary subterranean drilling system 801 that includes a rotating apparatus 700, as shown in FIG. 17, according to at least one embodiment. The subterranean drilling system 801 may include a housing 802 enclosing a downhole drilling motor 806 (i.e., a motor, turbine, or any other suitable device capable of rotating an output shaft, without limitation) that is operably connected to an output shaft 808.

The rotating apparatus 700 shown in FIG. 17 may be operably coupled to downhole drilling motor 806. A rotary drill bit 804, such as a rotary drill bit configured to engage a subterranean formation and drill a borehole, may be connected to output shaft 808. As illustrated in FIG. 18, rotary drill bit 804 may be a roller cone bit comprising a plurality of roller cones 860. According to additional embodiments, rotary drill bit 804 may comprise any suitable type of rotary drill bit, such as, for example, a so-called fixed-cutter drill bit. As a borehole is drilled using rotary drill bit 804, pipe sections may be connected to subterranean drilling system 810 to form a drill string capable of progressively drilling the borehole to a greater depth within a subterranean formation. Any of the thrust-bearing assemblies or radial bearing assemblies disclosed herein may be used in subterranean drilling system 801, without limitation.

A thrust-bearing assembly 710*a* in rotating 700 may be configured as a rotor that is attached to output shaft 808 and a thrust-bearing assembly 710*b* in rotating apparatus 700 may be configured as a stator. During a drilling operation using subterranean drilling system 801, the rotor may rotate in conjunction with output shaft 808 and the stator may remain substantially stationary relative to the rotor.

According to various embodiments, drilling fluid may be circulated through downhole drilling motor 806 to generate torque and effect rotation of output shaft 808 and rotary drill bit 804 attached thereto so that a borehole may be drilled. A portion of the drilling fluid may also be used to lubricate opposing bearing surfaces of superabrasive elements (e.g., superhard bearing elements 730*a* and 730*b*) on thrust-bearing assemblies 710*a* and 710*b*.

Figure 19:
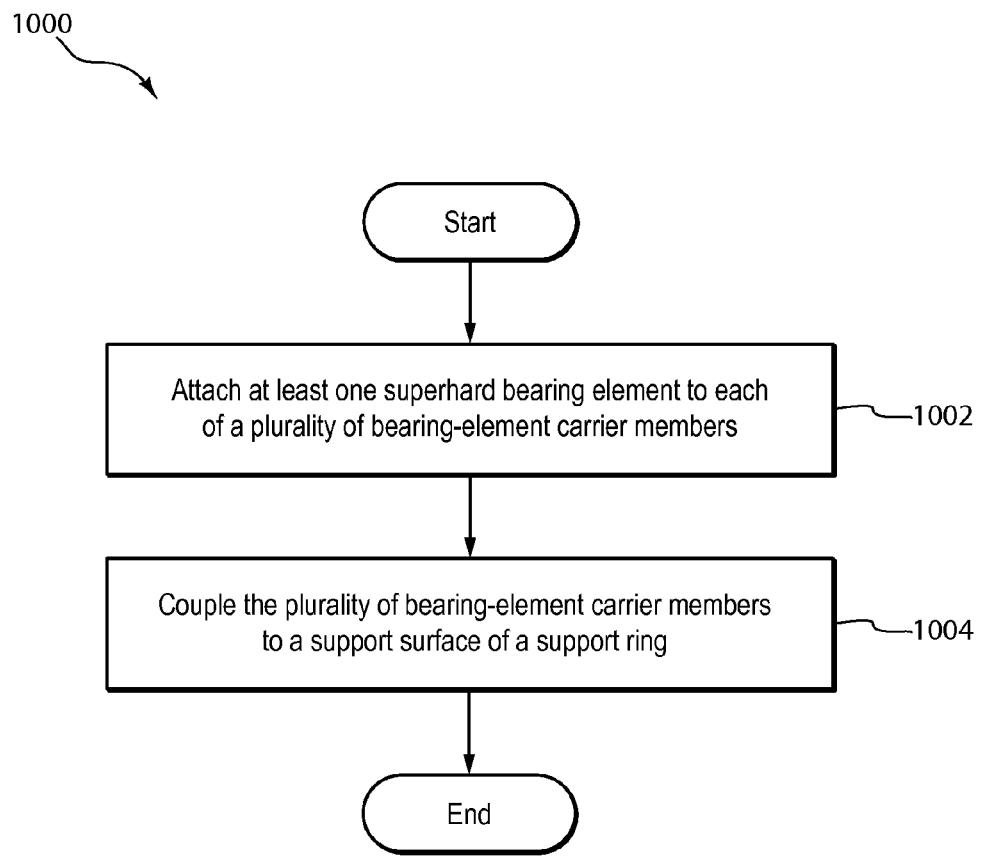
FIG. 19 is a flow diagram of an exemplary method for assembling a bearing assembly according to at least one embodiment.

FIG. 19 illustrates an exemplary method 1000 for assembling a bearing assembly according to at least one embodiment. As shown in FIG. 19, at least one superhard bearing element may be attached to each of a plurality of bearing-element carrier members (process 1002). For example, each of a plurality of bearing-element carrier members 24 illustrated in FIGS. 1-4 may be configured to receive multiple superhard bearing elements 30 that may be positioned in bearing-element recesses 42 of bearing-element carrier members 24. Superhard bearing elements 30 may each be inserted into a bearing-element recess 42 such that a substrate 38 of the superhard bearing element 30 is surrounded by the bearing-element recess 42 and such that a superhard table 36 attached to the substrate 38 at least partially extends above a top surface 90 of the bearing-element carrier member 24. Each superhard bearing element 30 may be fixedly secured within the bearing-element recess 42 of the bearing-element carrier member 24 through, for example, brazing, press-fitting, threaded attachment, and/or by any other suitable manner of attachment, without limitation.

The plurality of bearing-element carrier members may be coupled to a support surface of a support ring (process 1004). For example, the plurality of bearing-element carrier members 24 may be mounted and/or coupled to support surface 86 of support ring 20. The plurality of bearing-element carrier members 24 may be attached to support surface 86 of support ring 20 by fasteners (e.g., screws, rivets, pins, or bolts) and/or by any other suitable manner of attachment (e.g., welding, mechanically capturing, brazing, etc.), without limitation. In at least one embodiment, bearing-element carrier members 24 may be attached to support ring 20 by a plurality of fasteners 44 extending through fastener holes 28 defined in bearing-element carrier members 24 to corresponding holes defined in support ring 20.

According to some embodiments, at least one of the plurality of bearing-element carrier members may be replaced by removing the at least one bearing-element carrier member and coupling a replacement bearing-element carrier member to the support surface of the support ring. For example, a worn or damaged superhard bearing element 30 or bearing-element carrier member 24 may be replaced by removing fasteners 44 securing bearing-element carrier members 24 to support ring 20. A new or refurbished bearing element 30 or bearing-element carrier member 24 may then be coupled to support ring 20.

In at least one embodiment, the at least one superhard bearing element may be attached to each of the plurality of bearing-element carrier members by brazing the at least one superhard bearing element to each of the plurality of bearing-element carrier members. For example, superhard bearing elements 30 may be positioned in bearing-element recesses 42 of bearing-element carrier members 24 by brazing prior to coupling bearing-element carrier members 24 to support ring 20.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:
1. A thrust bearing assembly, comprising:
 a support ring;
 a plurality of bearing-element carrier members mechanically fastened to the support ring such that the plurality of bearing-element carrier members are distributed circumferentially about a central axis;

a plurality of superhard bearing elements each having a lateral periphery extending between a base and a superhard bearing surface, wherein:
- each of the superhard bearing surfaces is substantially planar;
- at least one superhard bearing element of the plurality of superhard bearing elements is attached to each of the plurality of bearing-element carrier members;
- each bearing element carrier member exhibits a partial toroidal shape.

2. The bearing assembly of claim 1, wherein each of a plurality of fasteners extends through an opening defined in a corresponding one of the plurality of bearing-element carrier members.

3. The bearing assembly of claim 1, wherein the plurality of bearing-element carrier members are bonded to the support ring.

4. The bearing assembly of claim 1, wherein each of the plurality of bearing-element carrier members abuts an adjacent one of the plurality of bearing-element carrier members.

5. The bearing assembly of claim 1, wherein the support ring comprises a continuous ring.

6. The bearing assembly of claim 1, wherein the plurality of superhard bearing elements are each attached within a bearing-element recess defined in a corresponding bearing-element carrier member of the plurality of the plurality of bearing-element carrier members.

7. The bearing assembly of claim 1, wherein the at least one superhard bearing element comprises a polycrystalline diamond table.

8. The bearing assembly of claim 7, wherein the polycrystalline diamond table is bonded to a substrate.

9. The bearing assembly of claim 7, wherein the polycrystalline diamond table is at least partially leached.

10. A bearing apparatus, comprising:
- a rotor;
- a stator;
- wherein the rotor and the stator each include:
  - a support ring;
  - a plurality of bearing-element carrier members mechanically fastened to the support ring;
  - a plurality of superhard bearing elements each having a lateral periphery extending between a base and a superhard bearing surface,
- wherein:
  - at least one superhard bearing element of the plurality of superhard bearing elements is attached to each of the plurality of bearing-element carrier members;
  - each bearing element carrier member exhibits a partial toroidal shape.

11. The bearing apparatus of claim 10, wherein the stator, the rotor, and the plurality of superhard bearing elements form at least part of a thrust-bearing apparatus.

12. The bearing apparatus of claim 10, wherein the stator, the rotor, and the plurality of superhard bearing elements form at least part of a radial-bearing apparatus.

13. A method for assembling a thrust bearing assembly, comprising:
- attaching at least one superhard bearing element to each of a plurality of bearing-element carrier members such that the plurality of bearing-element carrier members are distributed circumferentially about a central axis;
- mechanically fastening the plurality of bearing-element carrier members to a support ring,
- wherein
  - each of the superhard bearing surfaces is substantially planar;
  - each bearing element carrier member exhibits a partial toroidal shape.

14. The method of claim 13, further comprising replacing at least one of the plurality of bearing-element carrier members by removing the at least one bearing-element carrier member and coupling a replacement bearing-element carrier member to the support ring.

15. The method of claim 13, wherein attaching the at least one superhard bearing element to each of the plurality of bearing-element carrier members comprises brazing the at least one superhard bearing element to each of the plurality of bearing-element carrier members.

16. The method of claim 13, wherein coupling the plurality of bearing-element carrier members to the support ring comprises coupling the plurality of bearing-element carrier members to the support ring without heating the support ring.

17. A thrust bearing assembly, comprising:
- a support ring;
- a plurality of bearing-element carrier members coupled to the support ring such that the plurality of bearing-element carrier members are distributed circumferentially about a central axis;
- a plurality of superhard bearing elements each having a lateral periphery extending between a base and a superhard bearing surface,
- wherein:
  - each of the superhard bearing surfaces is substantially planar;
  - at least one superhard bearing element of the plurality of superhard bearing elements is attached to each of the plurality of bearing-element carrier members;
  - each of the plurality of bearing-element carrier members abuts an adjacent one of the plurality of bearing-element carrier members.

* * * * *